March 15, 1960   C. EDEN   2,928,887
METHOD AND APPARATUS FOR REFINING GLASS
Filed July 25, 1956   2 Sheets-Sheet 1

March 15, 1960   C. EDEN   2,928,887
METHOD AND APPARATUS FOR REFINING GLASS
Filed July 25, 1956   2 Sheets-Sheet 2

United States Patent Office 2,928,887
Patented Mar. 15, 1960

2,928,887

METHOD AND APPARATUS FOR REFINING GLASS

Carsten Eden, Mainz, Germany, assignor to Jenaer Glaswerk Schott & Gen., Mainz, Germany Application July 25, 1956, Serial No. 600,106

Claims priority, application Germany July 28, 1955

11 Claims. (Cl. 13—6)

The present invention relates to a new method for refining glass.

Glass-melting furnaces of the known types are generally divided into a melting zone, a refining zone, and a working zone. These zones may continue directly from one to the other or they may be separated from each other by floats, bridges or channels.

In these known furnaces, the refining zone has usually been made of extremely large dimensions since the usual gas heating from above through the surface of the glass batch permitted the molten glass to be freed from gases only if that surface was made very large. In such furnaces, it was always necessary to count with a considerable difference in temperature between the heated upper surface and the tank bottom so that the glass passed from the latter to the hotter surface zone only because of the convection currents which were in this case very desirable. In order to permit such an exchange and to carry out the refining process, it was necessary to provide the refining zone with a large surface area and to leave the molten glass in this area for a long period of time.

However, it has been found that the convection currents have the disadvantage of largely flowing in a direction opposite to the gas bubbles as they are rising to the surface, and of thus exerting a retarding effect upon these bubbles which, in turn, retards and obstructs the refining process. Furthermore, in such furnaces it cannot be avoided that glass which has already been completely refined and is located at the surface will be mixed with the glass from the bottom which still contains gases.

For accelerating the refining process, it has already been proposed to use additional electric heating means, and to separate the melting and refining processes entirely from each other so that the molten glass can pass from one zone to the other only through a connecting channel. These prior proposals for such additional heating resulted, however, in strong convection currents due to differences in temperature in the refining chamber which prevented the gas bubbles from rising uniformly.

It is now an object of the invention to provide a new method which will overcome the mentioned disadvantages of the prior methods and which additionally presents considerable advantages.

Accordingly, it is the principal object of the invention to provide a new method and new means for accelerating the refining process of the molten glass and to render the same more uniform, and thereby to improve the quality of the glass and also render the refining process more economical than was previously possible.

A further object of the invention is to provide a new method and new means for preventing the occurrence of convection currents in the batch of molten glass either entirely or at least as much as possible so that the gas bubbles can rise freely from the bottom of the glass furnace through the entire molten glass to the upper surface thereof without being obstructed in or deviated from their vertical path of movement.

This object of the invention is attained essentially by controlling the heating of the glass furnace and the heat transfer from the refining zone so that the molten glass will always have the same temperature in a vertical direction.

Although the new method and the purposes to be attained thereby do not require the temperature of the molten glass to be controlled so as to be uniform in the longitudinal direction of the refining zone, this may also be advisable in some cases, and provision may therefore also be made for this purpose in accordance with the present invention.

Although it is for practical reasons advisable to carry out the heating in a manner known as such by joulean heat, the present invention provides a new and special design and construction of the electrodes and a new manner of arranging the same in order to attain the desired objects.

Further and more specific objects, features, and advantages of the present invention will appear from the following detailed description thereof, particularly when read with reference to the accompanying drawings, in which—

Fig. 5a shows a diagrammatic view of the source of current used for heating the refining chamber according to Fig. 5; while

Figures 1, 2, 3:
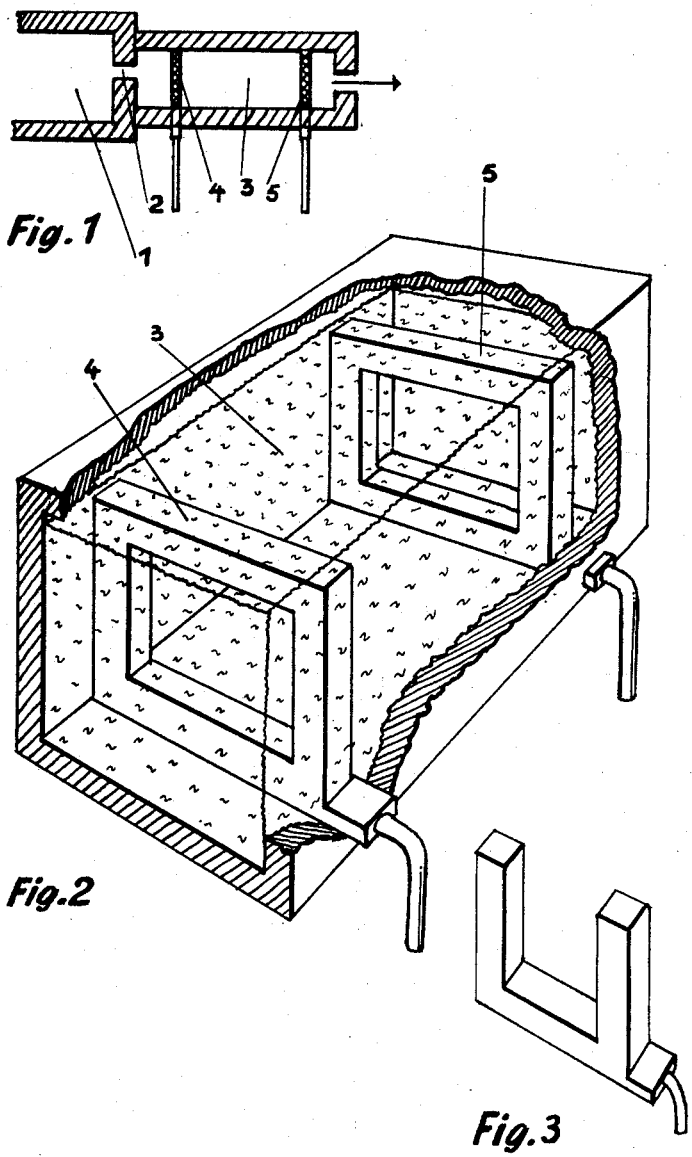
Fig. 1 shows a diagrammatic longitudinal cross section through a refining chamber with the electrodes therein.
Fig. 2 shows a perspective view of a refining chamber, parts of which are broken away for a better illustration of the invention.
Fig. 3 shows a perspective detail view of an electrode according to a modification of the invention.

Referring to the drawings, Fig. 1 illustrates the melting chamber 1 which is connected by a channel 2 with the refining chamber 3 from which the refined glass passes into the working zone, not shown, in the direction as shown by the arrow. According to the invention, the refining zone is made at least twice as long as it is wide so as to prevent any glass which is not as yet completely refined from passing out of the refining chamber into the working chamber.

As illustrated in Fig. 2, the electrodes 4 and 5 are of a substantially rectangular framelike shape and mounted on the inner walls of the refining chamber 3. Such design and arrangement of the electrodes permits the electric energy to be supplied to that particular area where the greatest losses in heat would ordinarily occur through radiation and convection. It is due particularly to such design of the electrodes that the molten glass, after it has reached the required temperature in the refining chamber, will remain at such temperature at all points thereof, and that the occurrence of any convection currents which might counteract the refining process will be prevented. It is thus merely necessary to control the supply of electric current to the electrodes so that the same amount of energy will be furnished to the refining chamber as is lost by the outer walls thereof.

Obviously, the heat may also and additionally be supplied externally. Furthermore, it is advisable partially to embed the framelike electrodes in the walls of the refining chamber.

If the refining chamber is to be heated not only by joulean heat but also from above, for example, by gas, the upper horizontal frame member of the electrodes may be omitted and a U-shaped design may be chosen, as illustrated in Fig. 3.

Figure 4:
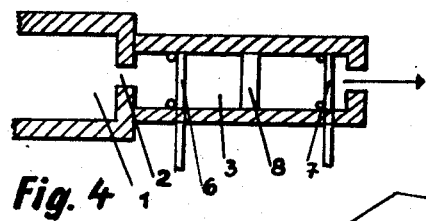
Fig. 4 shows a diagrammatic longitudinal cross section through a refining chamber provided with electrodes according to another modification of the invention.
Figure 5:
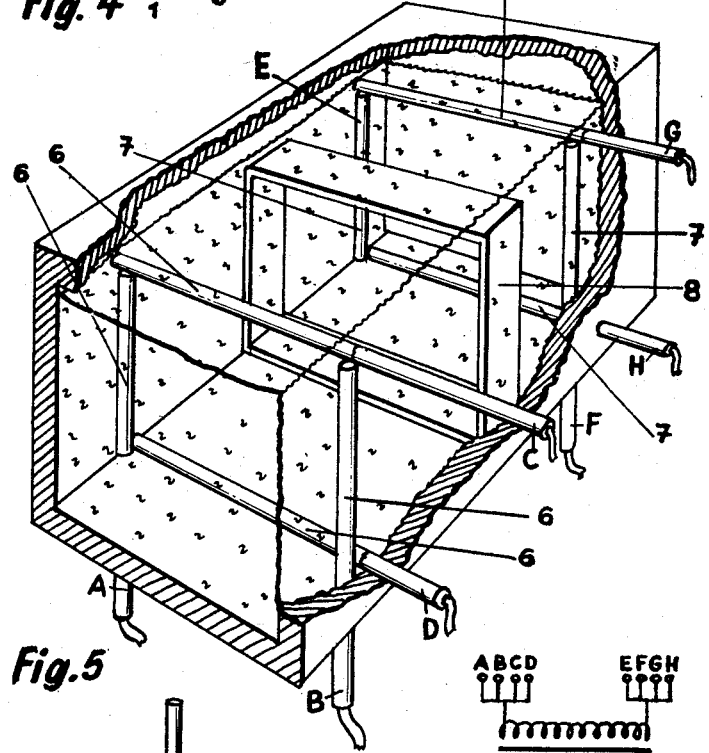
Fig. 5 shows a perspective view similar to Fig. 2 but showing the refining chamber as being provided with electrodes of the type as illustrated in Fig. 4.
Figure 5A:
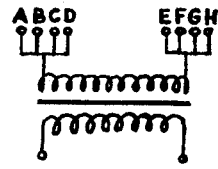

According to the modification of the invention as shown in Figs. 4, 5, and 5a, the electrodes 6 and 7 are rod-shaped and connected with the source of current by connections ABCD and EFGH, respectively. By interposing electric control elements of known types between the current source and the connections to the rods, the current supply may be regulated to each rod individually or to different groups of rods.

As also shown in Figs. 4 and 5, a frame 8 of electrically conductive material may be mounted on the inner wall of the furnace. This frame 8 is not directly connected with any of the electrodes and it has the purpose of concentrating the electric current paths along the walls. If desired, frame 8 may also consist of semi-conductive material.

Figure 6:
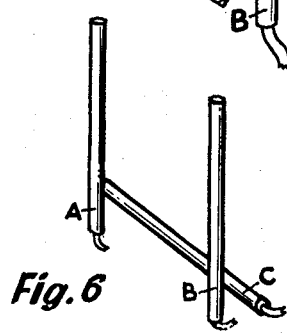
Fig. 6 shows another modification of the electrode according to the invention.

If the electric heating system is to be combined with a heating from above, electrodes 6 and 7 at the surface of the bath may be omitted so that the electrodes will then have a shape as shown in Fig. 6.

In numerous tests it has been found that after the required temperature has once been reached in all parts of the refining zone of a furnace designed according to the present invention, these temperatures will not differ at least in the vertical direction by more than 10 to 20° C. Such uniformity in temperature will prevent the occurrence of convection currents and the harmful effect thereof upon the refining process.

It has furthermore been found that with a furnace as designed according to the invention it will not be necessary to make the upper surface of the molten glass larger than 1 square meter per a glass charge of 4 tons per day at a glass level of approximately 80 cm.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A glass furnace comprising a refining chamber, a plurality of opposed spaced apart rectangular frame-like electrodes extending along the inner side, bottom, and upper walls of said chamber and current supply means for supplying power to said electrodes, said current supply means being so connected to said electrodes and said electrodes being so positioned as to cause the current flowing through a glass mass in said furnace to be confined to the area confined between said frame-like electrodes.

2. A glass furnace according to claim 1 wherein said plurality of frame-like electrodes extends along the upper surface of the molten glass therein.

3. A glass furnace according to claim 2 wherein said plurality of framelike electrodes are partially embedded in said inner side and bottom walls of said chamber.

4. A glass furnace according to claim 3 including means for controlling the current supply to each individual electrode.

5. A glass furnace according to claim 4 including a framelike member of conductive material mounted on the inner walls of said chamber intermediate said electrodes.

6. A glass furnace according to claim 2 wherein said refining chamber has a length at least twice as large as the width thereof.

7. A glass furnace according to claim 6 in which the glass surface in said refining zone does not exceed 1 m.$^2$ for a glass charge of 4 tons per day at a glass level of approximately 80 cm.

8. A glass furnace comprising a refining chamber, a plurality of opposed spaced apart U-shaped electrodes extending along the inner side, bottom and upper walls of said chamber and current supply means for supplying power to said electrodes, said current supply means being so connected to said electrodes and said electrodes being so positioned as to cause the current flowing through a glass mass in said furnace to be confined to the area confined between said U-shaped electrodes.

9. A glass furnace according to claim 8 including means for controlling the current supply to each individual electrode and means for heating the upper surface of the glass indirectly from above.

10. A glass furnace according to claim 9 wherein said refining chamber has a length at least twice as large as the width thereof.

11. A glass furnace comprising a refining chamber, a plurality of opposed spaced apart framelike electrodes at least extending along the inner side, bottom, and upper walls of said chamber and current supply means for supplying power to said electrodes, said current supply means being so connected to said electrodes and said electrodes being so positioned as to cause the current flowing through a glass mass in said furnace to be confined to the area confined between said framelike electrodes.

References Cited in the file of this patent

UNITED STATES PATENTS

| Number | Name | Date |
|---|---|---|
| 1,610,376 | Hitner | Dec. 14, 1926 |
| 1,610,377 | Hitner | Dec. 14, 1926 |
| 1,878,591 | McIntosh | Sept. 20, 1932 |
| 1,933,527 | Wadman | Oct. 31, 1933 |
| 2,089,690 | Cornelius | Aug. 10, 1937 |
| 2,336,412 | Messinger | Dec. 7, 1943 |
| 2,417,913 | Cornelius | Mar. 25, 1947 |
| 2,545,619 | Lambert | Mar. 20, 1951 |
| 2,649,487 | Phillips | Aug. 18, 1953 |
| 2,707,717 | Seymour | May 3, 1955 |
| 2,749,378 | Penberthy | June 5, 1956 |

FOREIGN PATENTS

| Number | Country | Date |
|---|---|---|
| 404,733 | Great Britain | Jan. 25, 1934 |